United States Patent
Mori et al.

(10) Patent No.: US 8,952,884 B2
(45) Date of Patent: Feb. 10, 2015

(54) SUSPENDED PARTICLE DEVICE, LIGHT CONTROL DEVICE USING THE SAME, AND METHOD FOR DRIVING THE SAME

(75) Inventors: Shunsuke Mori, Hitachi (JP); Yoshiro Mikami, Hitachiota (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 290 days.

(21) Appl. No.: 13/337,576

(22) Filed: Dec. 27, 2011

(65) Prior Publication Data

US 2012/0162292 A1    Jun. 28, 2012

(30) Foreign Application Priority Data

Dec. 27, 2010  (JP) .................................. 2010-289089

(51) Int. Cl.
*G09G 3/34* (2006.01)
*G02F 1/17* (2006.01)
*G02F 1/133* (2006.01)

(52) U.S. Cl.
CPC ............ *G02F 1/172* (2013.01); *G02F 1/13306* (2013.01)
USPC ........................................................ 345/107

(58) Field of Classification Search
CPC .................................. G09G 3/344–3/3446
USPC ............................................ 345/105–107, 97
See application file for complete search history.

(56) References Cited

U.S. PATENT DOCUMENTS

| | | | |
|---|---|---|---|
| 2002/0130831 A1* | 9/2002 | Engler et al. .................. 345/107 |
| 2004/0119680 A1* | 6/2004 | Daniel et al. .................. 345/107 |
| 2005/0024353 A1* | 2/2005 | Amundson et al. ........... 345/204 |
| 2005/0231451 A1* | 10/2005 | Chu et al. ........................ 345/87 |
| 2006/0152458 A1* | 7/2006 | Angele et al. .................. 345/90 |
| 2007/0070489 A1* | 3/2007 | Verhaegh et al. ............. 359/265 |
| 2007/0126695 A1* | 6/2007 | Kishi ............................ 345/107 |

(Continued)

FOREIGN PATENT DOCUMENTS

| | | |
|---|---|---|
| JP | 2004-191694 | 7/2004 |
| JP | 2007-011126 | 1/2007 |
| JP | 2007-506151 | 3/2007 |
| JP | 2007-506152 | 3/2007 |
| JP | 2009-69467 | 3/2009 |

(Continued)

OTHER PUBLICATIONS

Notice of Rejection in corresponding Japanese Appln No. 2010-289089, mailed Jun. 4, 2013, with English language translation thereof.

(Continued)

*Primary Examiner* — Chanh Nguyen
*Assistant Examiner* — Roy Rabindranath
(74) *Attorney, Agent, or Firm* — Antonelli, Terry, Stout & Kraus, LLP.

(57) ABSTRACT

Disclosed is a suspended particle device having a higher response speed of particles upon shutdown of the device. The suspended particle device includes a first substrate; a first electrode arranged on a surface of the first substrate; a second substrate; a second electrode arranged on a surface of the second substrate; and a suspension arranged between the first substrate and the second substrate, in which the suspension includes particles and a disperse medium, the particles are dispersed in the disperse medium, an orientation of the particles is controlled by an alternate-current voltage to be applied between the first electrode and the second electrode, and "a" which represents a frequency of an alternate-current voltage in a driving period is greater than "b" which represents a frequency of an alternate-current voltage in a shutdown period.

11 Claims, 11 Drawing Sheets

(56) References Cited

U.S. PATENT DOCUMENTS

| | | |
|---|---|---|
| 2009/0073111 A1 | 3/2009 | Miyazaki |
| 2009/0231267 A1* | 9/2009 | Uchida .................. 345/107 |
| 2009/0237383 A1 | 9/2009 | Saito |
| 2009/0316254 A1 | 12/2009 | Higashida et al. |
| 2010/0047593 A1 | 2/2010 | Higashida et al. |
| 2010/0127966 A1* | 5/2010 | Miyamoto .................. 345/107 |
| 2010/0309544 A1 | 12/2010 | Nomura et al. |
| 2011/0013260 A1 | 1/2011 | Ohno et al. |
| 2011/0057871 A1* | 3/2011 | Miyashita .................. 345/107 |
| 2011/0181575 A1* | 7/2011 | Sikharulidze et al. ........ 345/211 |

FOREIGN PATENT DOCUMENTS

| | | |
|---|---|---|
| JP | 2009/222901 | 10/2009 |
| JP | 2009-229853 | 10/2009 |
| JP | 2010-085620 | 4/2010 |
| WO | WO 2005/029170 | 3/2005 |
| WO | WO2005029171 | 3/2005 |

OTHER PUBLICATIONS

Office Action in corresponding Japanese Application No. 2010-289089, dated Sep. 17, 2013, with English language translation thereof.

\* cited by examiner

SUSPENDED PARTICLE DEVICE, LIGHT CONTROL DEVICE USING THE SAME, AND METHOD FOR DRIVING THE SAME

CLAIM OF PRIORITY

The present application claims priority from Japanese patent application serial No. 2010-289089, filed on Dec. 27, 2010, the content of which is hereby incorporated by reference into this application.

BACKGROUND OF THE INVENTION

1. Field of the Invention

The present invention relates to a suspended particle device, a light control device using the suspended particle device, and methods for driving these devices.

2. Description of Related Art

Patent Document 1 (Japanese Unexamined Patent Application Publication (Translation of PCT Application) No. 2007-506151) discloses an exemplary conventional technique as follows.

A suspended particle device (SPD) includes at least one compartment for housing a particle suspension 10a, 10b, means for applying a first electric field to the particle suspension 10a, 10b and means for applying a second electric field to the particle suspension 10a, 10b, the first and second electric fields having different field directions. A plurality of pixels are defined by a plurality of compartments, each housing a separate particle suspension 10a, 10b and/or regions of a particle suspension 10 within a compartment in which means for applying an inhomogeneous second electric field are provided. Each pixel may be tuned to a transmissive state, a reflective state or an intermediate state or 'grey value', so that the SPD 4 may be used to display imaging or text. The SPD 4 may be reset by bringing the pixels into the same state by applying an appropriate electric field to one or more pixels.

SUMMARY OF THE INVENTION

A suspended particle device includes a first substrate; a first electrode arranged on a surface of the first substrate; a second substrate; a second electrode arranged on a surface of the second substrate; and a suspension arranged between the first substrate and the second substrate, in which the suspension includes particles and a disperse medium, the particles are dispersed in the disperse medium, an orientation of the particles is controlled by an alternate-current voltage to be applied between the first electrode and the second electrode, and "a" which represents a frequency of an alternate-current voltage in a driving period is greater than "b" which represents a frequency of an alternate-current voltage in a shutdown period.

The present invention allows a suspended particle device and a light control device using the suspended particle device to have a higher response speed of particles in a shutdown period of the device. Other objects, features, and advantages of the present invention will be understood more fully from the following detailed description of embodiments.

DETAILED DESCRIPTION OF THE PREFERRED EMBODIMENTS

Figure 1:
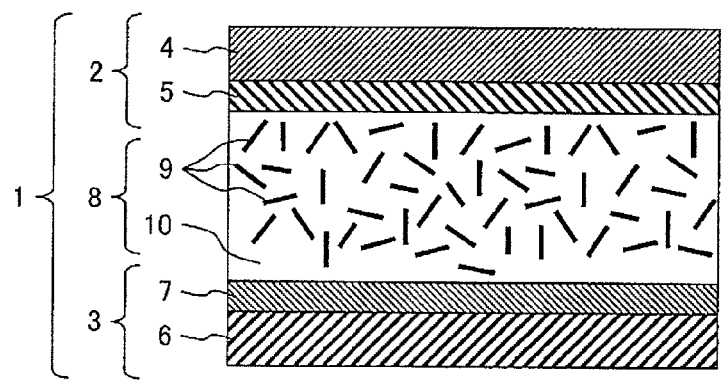
FIG. 1 is a cross section view illustrating an arrangement of a suspended particle device according to an embodiment.

Such a conventional suspended particle device as disclosed in Patent Document 1, however, has a low response speed of particles used therein when the suspended particle device is stopped at a frequency as that in driving of the suspended particle device.

Accordingly, an object of the present invention is to improve the response speed of the particles in a shutdown period of the suspended particle device and of a light control device using the suspended particle device.

The present invention provides followings to achieve the object.

(1) a suspended particle device includes a first substrate and a second substrate; and a first electrode, a second electrode, and a suspension (a suspension liquid) each arranged between the first substrate and the second substrate, in which the suspension includes particles and a disperse medium, the particles are dispersed in the disperse medium, the orientation of the particles is controlled by an alternate-current voltage to be applied between the first electrode and the second electrode, and "a" is greater than "b" where "a" represents a frequency (Hz) of an alternate-current voltage in a driving period of the suspended particle device; and "b" represents a frequency (Hz) of an current-current voltage in a shutdown period of the suspended particle device.

(2) The suspended particle device of the above (1) may further include a resin between the first substrate and the second substrate, and the suspension may be dispersed in the resin.

(3) In the suspended particle device of the above (1), the particles may have optical anisotropy.

(4) In the suspended particle device of the above (1), the particles may be rod-like and may have aspect ratios of 5 or more and 30 or less.

(5) In the suspended particle device of the above (1), the particles may include at least one material selected from the group consisting of polyperiodides, carbon-base materials, metallic materials, and inorganic compounds.

(6) In the suspended particle device of the above (1), the particles may undergo an orientation polarization by an action of an alternate-current voltage applied in a driving period of the suspended particle device.

(7) In the suspended particle device of the above (1), the frequency "a" is preferably 16 Hz or more and 1000 Hz or less.

(8) In the suspended particle device of the above (1), the frequency "b" is preferably 0.010 Hz or more and 15 Hz or less.

(9) In an embodiment of the suspended particle device of the above (1), a first alternate-current voltage is applied between the first electrode and the second electrode in a shutdown period of the suspended particle device, a second alternate-current voltage is applied between the first electrode and the second electrode after the application of the first alternate-current voltage, and $|V_1|$ is greater than $|V_2|$ where $V_1$ represents the first alternate-current voltage; and $V_2$ represents the second alternate-current voltage.

(10) In an embodiment of the suspended particle device of the above (1), a first ramp wave is applied between the first electrode and the second electrode in a shutdown period of the suspended particle device, and $|dV_1/dt_1|$ is constant where $V_1$ represents an alternate-current voltage between the first electrode and the second electrode upon the application of the first ramp wave; and $t_1$ represents an application time of the first ramp wave.

(11) In an embodiment of the suspended particle device of the above (1), a second ramp wave is applied between the first electrode and the second electrode in a shutdown period of the suspended particle device after the application of the first ramp wave between the first electrode and the second electrode, and $|dV_1/dt_1|$ is smaller than $|dV_2/dt_2|$ where $V_1$ represents an alternate-current voltage between the first electrode and the second electrode upon the application of the first ramp wave; $t_1$ represents an application time of the first ramp wave; $V_2$ represents an alternate-current voltage between the first electrode and the second electrode upon the application of the second ramp wave; and $t_2$ represents an application time of the second ramp wave.

(12) In an embodiment of the suspended particle device of the above (1), a voltage between the first electrode and the second electrode is brought to 0 V after the first ramp wave is applied between the first electrode and the second electrode but before the first ramp wave brings an alternate-current voltage applied between the first electrode and the second electrode to 0 V in a shutdown period of the suspended particle device.

The present invention further provides (13) a method for driving a suspended particle device, the device including a first substrate; a first electrode arranged on a surface of the first substrate; a second substrate; a second electrode arranged on a surface of the second substrate; a suspension arranged between the first substrate and the second substrate; and a signal processing circuit, the suspension including particles and a disperse medium, the particles being dispersed in the disperse medium, the method including the steps of applying an alternate-current voltage between the first electrode and the second electrode to control orientation of the particles; and changing the alternate-current voltage applied between the first electrode and the second electrode and a frequency of the alternate-current voltage by the signal processing circuit, in which the signal processing circuit controls a frequency "a" (Hz) and a frequency "b" (Hz) to satisfy the following condition: a>b, where the frequency "a" is of an alternate-current voltage in a driving period, and the frequency "b" is of an alternate-current voltage in a shutdown period.

(14) In an embodiment of the method of the above (13), the alternate-current voltage is applied in a half cycle or less during a period from a start of the shutdown period of the suspended particle device until the alternate-current voltage applied between the first electrode and the second electrode becomes 0 V.

A light control device includes the above suspended particle device and a drive unit.

The present invention will be illustrated in detail with reference to several specific embodiments below. It should be noted, however, that the following embodiments are illustrated only by way of example of the present invention and are never construed to limit the scope of the present invention; and it is apparent to those skilled in the art that various changes and modifications may be made without departing from the spirit and scope of the present invention as set forth herein and in the appended claims. In all the drawings to illustrate the embodiments, elements or parts having the same function are indicated by the same reference sign, and repeating description thereof may be omitted.

First Embodiment

Suspended Particle Device (SPD)

To facilitate an understanding of this embodiment, the basic structure and other conditions of a suspended particle device (SPD) which we have investigated will be illustrated.

FIG. 1 is a schematic cross sectional view illustrating structure of the SPD which we have investigated.

The suspended particle device 1 (SPD) includes a B-plate 2, an A-plate 3 and a suspension 8. In this figure, the suspension 8 is held between the A-plate 3 and the B-plate 2. The A-plate 3 includes an A-substrate 6 and an X electrode 7 formed thereon. The B-plate 2 includes a B-substrate 4 and a Y electrode 5 formed thereon. The suspension 8 includes light control particles 9 and a disperse medium 10. The X electrode 7 and the Y electrode 5 which are a pair of electrodes are arranged to face each other, and form an electric field in the suspension 8 therebetween.

Each of the A-plate 3 and the B-plate 2 is an electroconductive base. The A-substrate 6 and the B-substrate 4 are transparent supporting bases made from glass. The X electrode 7 and Y electrode 5 are transparent electrodes including indium tin oxide (ITO). In other words, the X electrode 7, the Y electrode 5 and the suspension 8 are arranged between the A-substrate 6 and the B-substrate 4. Both the X electrode 7 and the Y electrode 5 may be arranged on either one of the A-substrate 6 and the B-substrate 4.

The transparent supporting bases may be films of resins such as polyethylene terephthalates (PETs), polycarbonates (PCs) and cyclo-olefin polymers (COPs). The X electrode 7 and the Y electrode 5 may each be made typically of indium zinc oxide (IZO), tin oxide, zinc oxide, a carbon nanotube or a graphene. In this embodiment, the transparent electrodes are formed all over the supporting bases, but they may be provided in a pattern typically of a circle or in a pattern of a character.

The A-plate 3 and the B-plate 2 are arranged to face each other, and a sealant containing spacer beads etc. is applied to opposite sides of edges (not shown) of the two plates to bond the two plates with each other. This forms a suspension-charging space for the suspension 8 with a distance between the two plates of 25 μm. The distance between the two plates (i.e., thickness of the suspension-charging space) may be 4 μm or more and 100 μm or less. The suspension-charging space may be maintained by dispersing spacer beads in between the A-plate 3 and the B-plate 2. Exemplary spacer beads include beads of glass and of polymers. They are preferably those stable to the adhesive (sealant). The spacer beads dispersed in between the A-plate 3 and the B-plate 2 preferably have a refractive index near to that of the disperse medium 10. Herein, "4 μm or more and 100 μm or less" shows "4 to 100 μm". Numerical ranges showing hereinafter are also similar.

The suspension 8 will be illustrated below.

The light control particles 9 are dispersed in the disperse medium 10.

The light control particles 9 are made typically from a polyperiodide, have anisotropy in their shape, exhibit optical anisotropy with difference in absorbance due to orientation directions, and have aspect ratios of not 1. The light control particles 9 preferably undergo orientation polarization at frequencies equal to or lower than the frequency of an alternate-current voltage in a driving period of the suspended particle device. In this case, the light control particles 9 are preferably derived from a dielectric material having low electroconductivity. Examples of the dielectric material having low electroconductivity include polymer particles, and particles coated with a polymer. The light control particles 9 may possibly be in the form of rods or plates. Increase in resistance upon rotational motion of the particles with respect to an electric field and increase in haze upon transmission may be suppressed by designing of the light control particles 9 to be rod-like. The light control particles 9 preferably have aspect ratios of typically about 5 or more and about 30 or less (5 to 30). The light control particles 9 designed to have aspect ratios of 5 or more may exhibit optical anisotropy due to the shape of the light control particles 9. And the light control particles 9 designed to have aspect ratios of 30 or less may decrease transparency in a light blocking operation. The light control particles 9 having aspect ratios of more than 30 often have short axes which is very small, that is, such light control particles 9 have ultrathin-wire-like shapes. Hence, the light control particles 9 having aspect ratios of more than 30 have a small sectional area, and have a small light absorption. It results in a high transparency in the light blocking operation and a worse contrast in a light control state.

The light control particles 9 have sizes (long axes) of preferably 1 μm or less, more preferably 0.1 μm or more and 1 μm or less (0.1 to 1 μm), and furthermore preferably 0.1 μm or more and 0.5 μm or less (0.1 to 0.5 μm). The light control particles 9 having sizes of more than 1 μm may suffer from insufficient transparency because typically of light scattering or of reduced orientation motion of the light control particles 9 in the disperse medium 10 upon application of an electric field. The sizes of the light control particles 9 may be measured typically by an electron microscopic observation.

The light control particles 9 may be particles made of any of materials including carbon-base materials such as carbon black; metallic materials such as copper, nickel, iron, cobalt, chromium, titanium and aluminum; and inorganic compounds such as silicon nitride, titanium nitride and aluminum oxide. The light control particles 9 may also be particles which are any of these materials coated with a polymer. The light control particles 9 may include one of such materials or may include two or more of the materials in combination.

The disperse medium 10 herein is a liquid copolymer including an acrylic acid ester oligomer. Exemplary materials for the disperse medium 10 further include polysiloxanes (silicone oils). The disperse medium 10 preferably employs a liquid copolymer which has such a viscosity as to allow the light control particles 9 to be suspended therein, which has a high resistance, which has no affinity for the A-substrate 6, the B-substrate 4, the X electrode 7 and the Y electrode 5, which has a refractive index near to those of the A-substrate 6 and the B-substrate 4, and which has a permittivity different from that of the light control particles 9. Specifically, the disperse medium desirably has a resistivity of $10^{12}$ Ωm or more and $10^{15}$ Ωm or less ($10^{12}$ to $10^{15}$ Ωm) at 298 K. A difference in permittivity between the disperse medium 10 and the light control particles 9 may function as driving force in an alternate-current electric field upon orientation action of the light control particles 9 mentioned below. In this embodiment, the disperse medium 10 is designed to have a relative permittivity of 3.5 or more and 5.0 or less (3.5 to 5.0).

The suspension 8 can be charged into the suspension-charging space from openings (ends) between the two plates not bonded with the sealant through a capillary action. After charging the suspension 8 into between the A-plate 3 and the B-plate 2, the not-bonded openings (ends) between the two plates is bonded and sealed with the sealant. This isolates the suspension 8 from outsides.

(Light Control Device)

Figure 2:
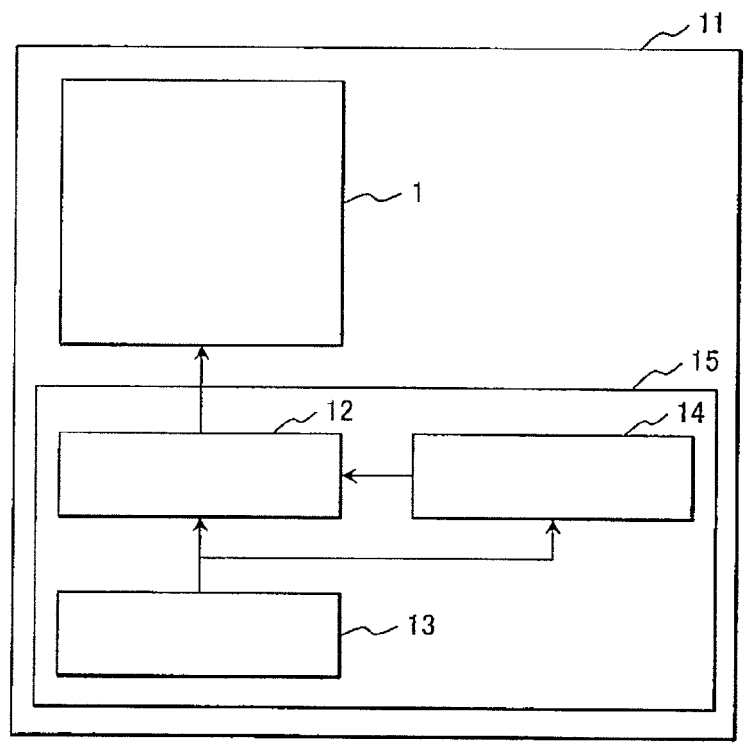
FIG. 2 is a block diagram illustrating a light control device using the suspended particle device according to the embodiment.

FIG. 2 is a block diagram illustrating an arrangement of a light control device including the SPD.

In this figure, a light control device 11 includes an SPD 1 and a drive 15 (a drive unit). The drive 15 includes a drive control circuit 12, a drive power supply 13 and a signal processing circuit 14. The drive control circuit 12 and the drive power supply 13 serve to drive the SPD 1 by the action of the X electrode 7 and the Y electrode 5. The signal processing circuit 14 processes input signals for controlling a light-control area and a light control state. The signal processing circuit 14 changes an alternate-current voltage, and its frequency which are applied in a startup period, a sustaining period and a shutdown period. The light control device 11 may further include an external-signal input unit that inputs external-environment information signals regarding an incident light and a temperature into the signal processing circuit 14.

The light control device 11 according to this embodiment may be advantageously usable in applications such as indoor and outdoor partitions; window panes/roof light windows for buildings; flat panel displays for use in electronic industry and in video equipment; instrument panels and alternatives for already-existing liquid crystal displays; optical shutters; indoor and outdoor advertisement and guide indicators; window panes for aircraft, railroad vehicles and shipping; windowpanes, rear-view mirrors and sliding roofs for automobiles; spectacle glasses; sunglasses; sun visors; and imaging devices. The way to apply the light control device 11 according to this embodiment is not limited. Specifically, the light control device 11 may be directly used, but may be used in some applications typically while holding the light control device 11 according to this embodiment between two plies of a base or while affixing the light control device 11 to one side of the base. The base may be, for example, glass or a polymer film, as in the A-substrate 6 and the B-substrate 4.

(SPD Driving Method)

Next, driving methods will be illustrated.

Figure 3:
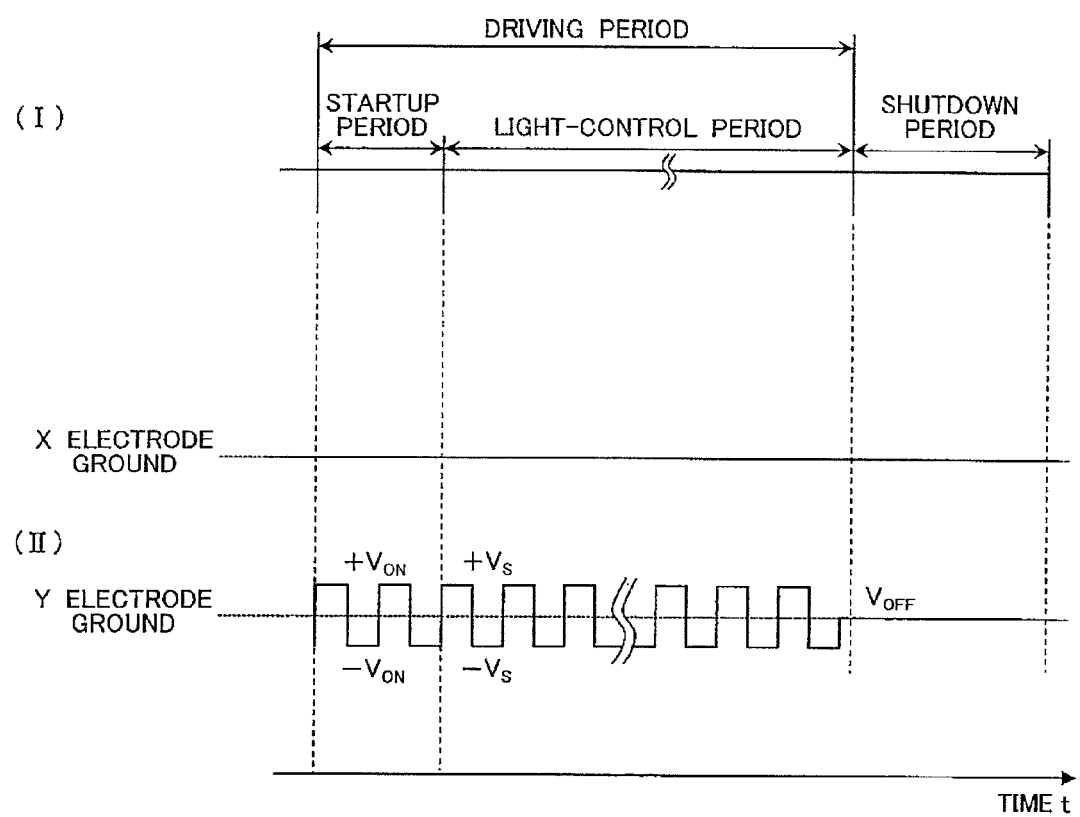
FIG. 3 is a graph showing steps of controlling a light, and a driving waveform employed therein in the suspended particle device according to the embodiment.
Figure 4A:
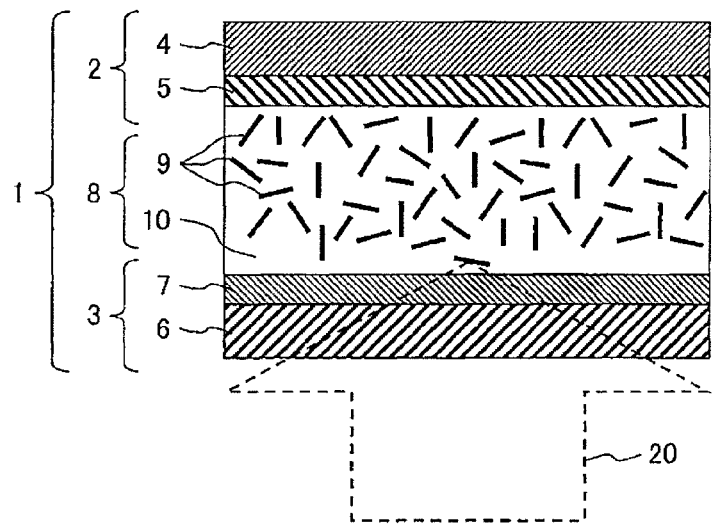
FIG. 4A is a cross section view illustrating a state of the light control particles in a shutdown period of the suspended particle device of FIG. 1.
Figure 4B:
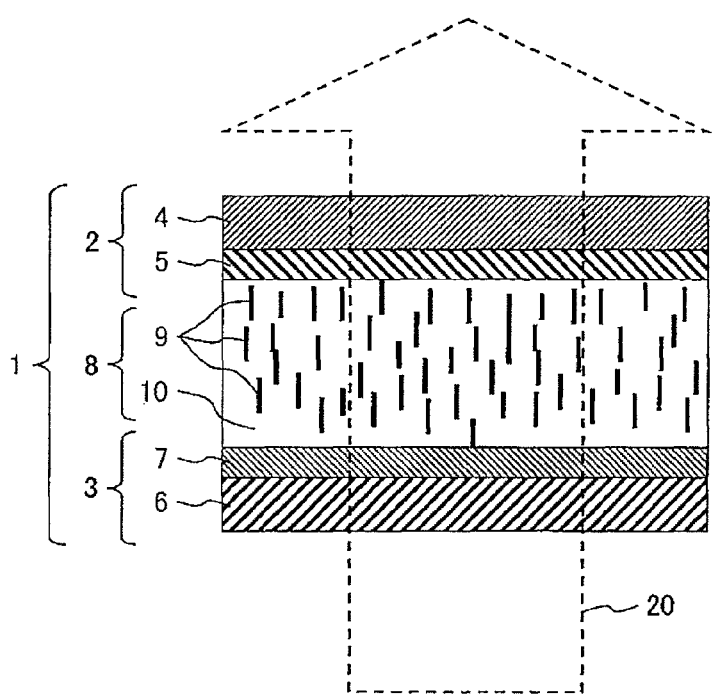
FIG. 4B is a cross section view illustrating a state of the light control particles during driving in the suspended particle device of FIG. 1.

FIG. 3 is an explanatory diagram illustrating a driving method investigated in this embodiment. FIG. 3 depicts (I) a schematic diagram of the driving method investigated in this embodiment and (II) a driving waveform of the driving method investigated in this embodiment. The driving method herein includes a startup period, a sustaining period (a light control period) and a shutdown period. FIGS. 4A and 4B illustrate how light control particles are in the SPD under respective driving conditions. In this embodiment, the startup period and the sustaining period are defined as a driving period of the SPD. However, a period prior to the change of the driving frequency of the suspended particle device may be defined as a driving period. FIG. 4A depicts a state upon shutdown (light blocking) of the SPD; and FIG. 4B depicts a state upon driving (during driving, light transmission) of the SPD.

The startup period corresponds to a light control startup period, namely, a transmission operation period in this embodiment. In the startup period, an alternate-current waveform at an applied voltage (hereinafter also simply referred to as "voltage") $V_{ON}$ is applied to the Y electrode 5 or the X electrode 7 to form an alternate-current electric field between the X electrode 7 and the Y electrode 5. In response to the alternate-current electric field, the light control particles 9 in the suspension 8 which have been in a random orientation state due to Brownian motion undergo orientation along the electric field direction corresponding to the applied voltage $V_{ON}$. The orientation is due typically to dielectric polarization. The oriented light control particles 9 modulate incident light 20. When the direction of the incident light 20 is identical to the direction of the electric field and the orientation direction of the particles, the incident light 20 can be transmitted through the suspension 8, and this increases a transmittance T of the SPD. The state in which the transmittance of the SPD increases is defined as an ON state. A frequency $f_{ON}$ in the startup period is such as to allow the light control particles 9 to undergo an orientation action uniformly in the disperse medium 10 without problems such as aggregation and/or flocculation. The frequency $f_{ON}$ is determined depending typically on conditions or parameters for the light control particles 9 such as concentration, permittivity, shape and affinity for the disperse medium 10 and on parameters of the disperse medium 10 such as viscosity, and is preferably 1000 Hz or lower. The frequency $f_{ON}$ of the startup period is preferably 16 Hz or higher, but is not limited thereto. The driving waveform to form the alternate-current electric field may be an alternate-current waveform including a sine wave, a rectangular wave or a triangular wave. Alternate current waveforms differing in polarity by a half cycle may be simultaneously applied to the X electrode 7 and the Y electrode 5, respectively. The simultaneous application of alternate-current waveforms differing in polarity by a half cycle to the X electrode 7 and the Y electrode 5 respectively allows the use of a low-voltage circuit element having low voltage endurance. In FIG. 3, the frequency $f_{ON}$ is designed to be constant, but the frequency $f_{ON}$ may be modulated.

The sustaining period corresponds to a light control period, namely, a period for maintaining a predetermined transmission state in this embodiment. In the sustaining period, an alternate-current waveform at a sustaining-period frequency $f_S$ and a sustaining-period voltage $V_S$ is applied to the Y electrode 5 to form an alternate-current electric field between the two electrodes, i.e., the X electrode 7 and the Y electrode 5. The sustaining-period frequency $f_S$ may be 16 Hz or higher and 1000 Hz or lower (16 to 1000 Hz), and is preferably 50 Hz or higher and 1000 Hz or lower (50 to 1000 Hz). The time when the transmittance of the SPD which has increased in the startup period becomes approximately constant is the start of the sustaining period. In the sustaining period, the SPD has a maximum transmittance at a predetermined voltage $V_S$. The frequency $f_S$ of the alternate-current electric field should be such as to drive the device at a frequency equal to or higher than a frequency to maintain the light control particles 9 in an orientation state being orientated along with the direction of the electric field between the electrodes. The frequency $f_S$ is desirably a critical flicker frequency (CFF) or higher and is preferably 15 Hz or higher. In FIG. 3, the sustaining-period frequency $f_S$ is equal to the startup-period frequency $f_{ON}$, but it may be designed to differ from $f_{ON}$.

In this embodiment, the sustaining-period voltage $V_S$ is designed to be equal to the startup-period voltage $V_{ON}$, but it may be designed to differ from $V_{ON}$. The alternate-current waveform in the sustaining period may be a sine wave, or a rectangular wave, or a triangular wave, as in the startup period. Alternate current waveforms differing in polarity by a half cycle may be simultaneously applied to the X electrode 7 and the Y electrode 5, respectively.

The shutdown period corresponds to a light control shutdown period, namely, a light blocking operation in this embodiment. In the shutdown period, a voltage $V_{OFF}$ to be applied between the Y electrode 5 and the X electrode 7 is set to be 0 V so as to allow the alternate-current voltage between the two electrodes, i.e., the X electrode 7 and the Y electrode 5 to be 0 V, namely, to allow the electrodes to have an equipotential. This brings the light control particles 9 in the suspension 8 which has been in a predetermined orientation state with respect to the electric field direction by the operation of the voltage $V_S$ into a random state due to Brownian motion. The incident light 20 is impeded the transmission and blocked because of absorption and/or scattering of the incident light in the suspension 8. The time when the driving frequency of the suspended particle device is changed is the start of the shutdown-period.

In FIG. 3, the start of the shutdown-period is designed to be the time when one cycle of the alternate-current waveform completes, but it may be designed to be the time when a period other than the one cycle of the alternate-current waveform, such as one-third of the alternate-current waveform completes. In this case, the operation of the device shifts from the sustaining period to the shutdown period at a voltage where some voltage is applied, and this allows rapid shift to a shutdown (transmission reduction) action.

(Driving Waveform and Response Time of Light Control Operation)

Figure 5:
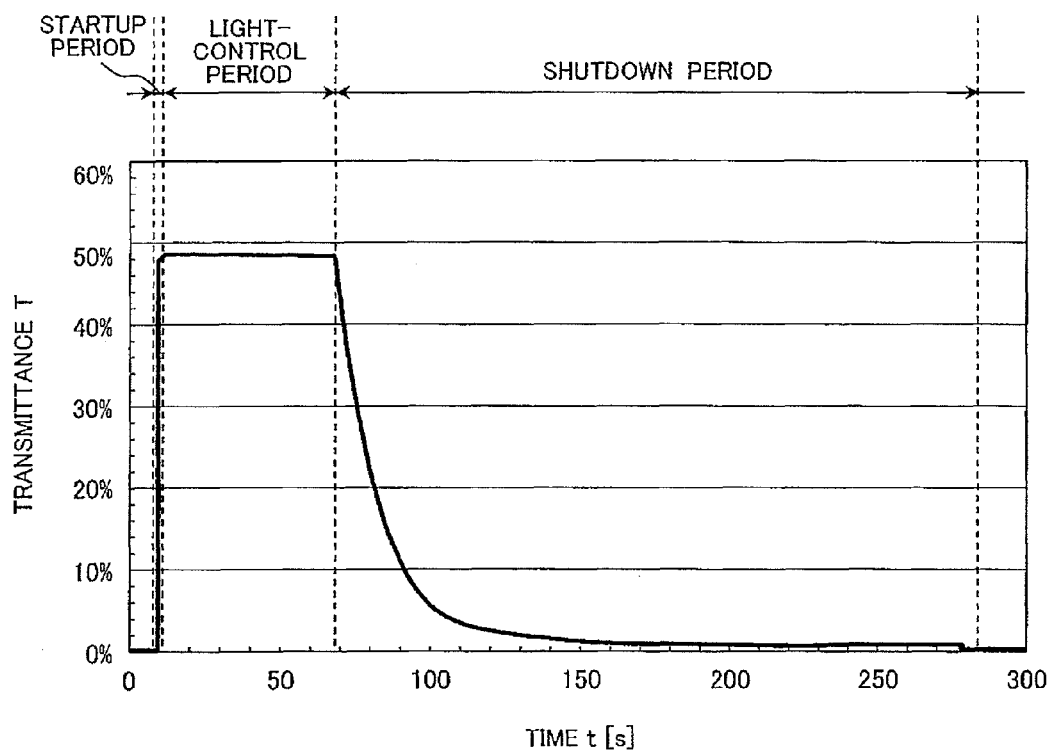
FIG. 5 is a graph showing a response time in a transmittance variation in the steps of controlling the light in the suspended particle device according to the embodiment.

FIG. 5 is a graph illustrating how the transmittance T of the incident light coming into the substrate in the electric field direction varies, namely, how the response time of light control operation varies depending on a driving method of the SPD. In this driving method, the driving-waveform voltage $V_{ON}$ and the sustaining-period voltage $V_S$ are set to be 100 V, the voltage $V_{OFF}$ is set to be 0 V, and frequencies $f_{ON}$ and $f_S$ are set to be 50 Hz. A frequency $f_{OFF}$ represents a shutdown-period frequency. In the SPD according to this embodiment, the light control particles are sufficiently oriented to the electric field direction, and thereby the SPD has an approximately maximum transmittance T when the voltages $V_{ON}$ and $V_S$ are set to be 100 V.

On the driving waveform in FIG. 5, it takes a longer time for the transmittance to vary in the shutdown period than in the startup period. This is generally because the action time for bringing the light control particles into a random state due to Brownian motion in the shutdown period is much longer than the action time for orienting the light control particles by the action of the alternate-current electric field in the startup period.

Figure 6A:
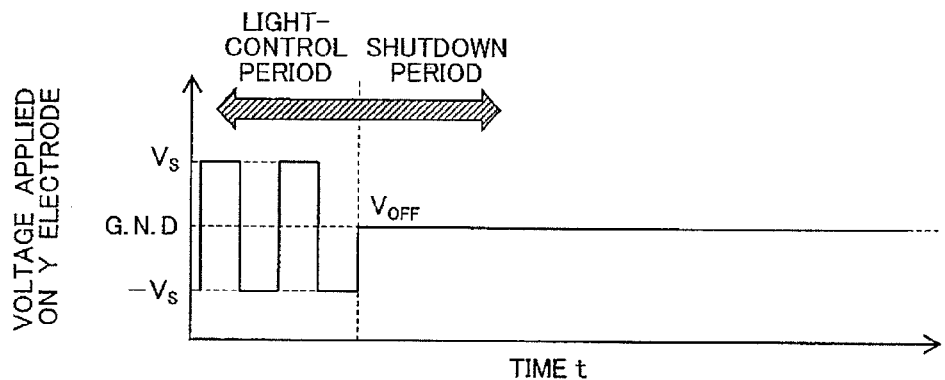
FIGS. 6A, 6B, 6C, 6D, 6E and 6F are graphs showing driving waveforms during shutdown-periods in embodiments.
Figure 6B:
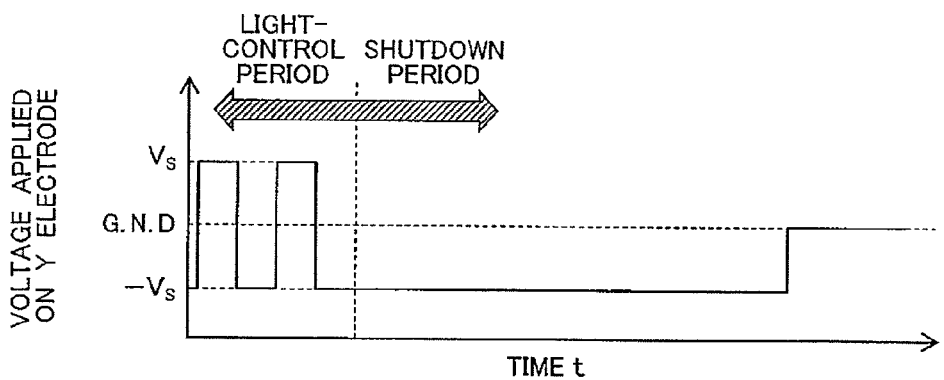

In consideration of these, the voltage $V_{OFF}$ in the shutdown period immediately after the completion of the sustaining period is designed not to be 0 V as in FIG. 6A, but an alternate-current waveform at a frequency $f_{OFF}$ is applied between the X electrode 7 and the Y electrode 5 as in FIG. 6B in this embodiment. This waveform seems to be a direct-current voltage of $-V_S$ at a predetermined period in FIG. 6B. In the embodiment in FIG. 6B, a voltage $V_S$ is applied from the start of the shutdown period to the lapse of a half cycle of the frequency $f_{OFF}$, and thereafter the voltage $V_{OFF}$ is brought into 0 V. Specifically, the voltage $V_{OFF}$ is brought into 0 V after the driving frequency of the suspended particle device is changed to the frequency $f_{OFF}$. This suppresses the observation of states of light transmission/blocking action (light-dark change) following the alternate-current signal. The shutdown-period frequency $f_{OFF}$ and the sustaining-period frequency $f_S$ satisfy the following condition: $f_{OFF}<f_S$.

Figure 7A:
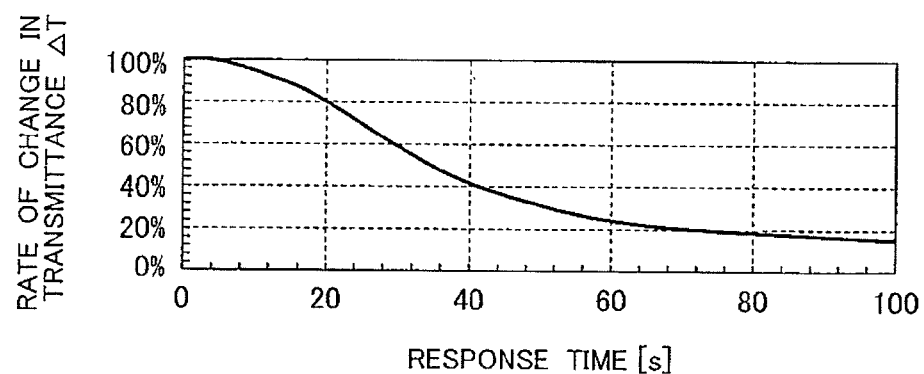
FIGS. 7A, 7B, 7C, 7D, 7E and 7F depict measured data of responses during the shutdown-periods in the embodiments.
Figure 7B:
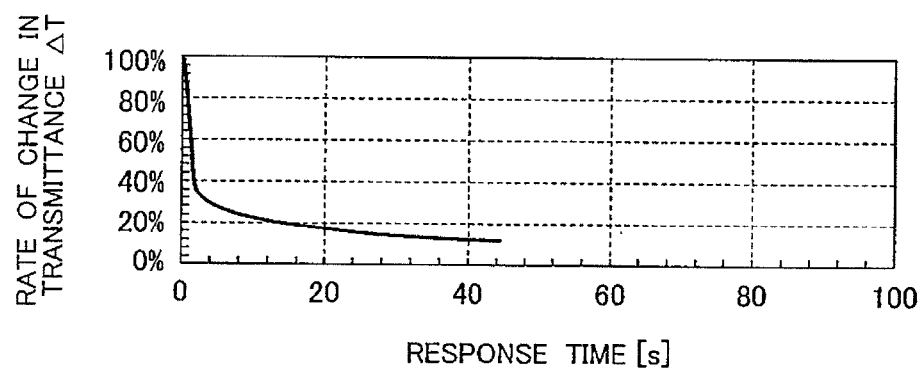

FIGS. 7A, 7B, 7C, 7D and 7F depict measured data of the response time of light control operation in the shutdown period while using a rectangular wave as the alternate-current waveform of driving waveform and setting the frequency $f_S$ to be 100 Hz. In these figures, the ordinate indicates the rate of change in transmittance ΔT provided so that the transmittance change from the light blocking state before the startup period to the sustaining period is 100%, and the abscissa indicates the response time. FIG. 7A depicts measured data in a driving method where the voltage $V_{OFF}$ is brought into 0 V immediately after the completion of the sustaining period, whereas FIG. 7B depicts measured data according to this embodiment. According to this embodiment, an alternate-current waveform at a frequency $f_{OFF}$ of 0.25 Hz is applied in the shutdown period at a voltage $V_{OFF}$ equal to the voltage $V_S$ for a period corresponding to a half cycle, as illustrated in FIG. 6B. When the alternate-current waveform is a rectangular wave, it is preferred to apply an alternate-current waveform for a period corresponding to a half cycle or less from the start of the shutdown period until the alternate-current voltage applied between the first electrode and the second electrode (X electrode and Y electrode) reaches 0V.

The upper limit of the frequency $f_{OFF}$ is CFF, and the lower limit thereof is such a frequency that materials constituting the SPD are not damaged due typically to electrolysis during the application of the voltage $V_{OFF}$ and that the SPD exhibits an equivalent light control operation even upon another drive of the device. In consideration of these, the frequency $f_{OFF}$ is preferably 0.010 Hz or higher and 15 Hz or lower (0.010 to 15 Hz), and more preferably 0.10 Hz or higher and 15 Hz or lower (0.10 to 15 Hz), though it may vary depending on the voltage $V_{OFF}$.

FIG. 7B demonstrates that the driving method (driving waveform) according to this embodiment requires a very short time for the reduction in transmittance in the shutdown period, i.e., provides a very short response time of light blocking operation as compared to that of the conventional driving method (driving waveform) in FIG. 7A. This indicates that the SPD and the light control device each exhibiting a high-speed light control action in the shutdown period are obtained without requiring modification of the basic structure of the SPD by the application of an alternate-current waveform in the shutdown period at a shutdown-period frequency $f_{OFF}$ shorter than the sustaining-period frequency $f_S$.

Second Embodiment

Another embodiment of the present invention will be illustrated in detail below. An SPD according to this embodiment has a structure as with that of the SPD of First Embodiment, and a driving method according to this embodiment is as with that of First Embodiment, except for the shutdown period.

Figure 6C:
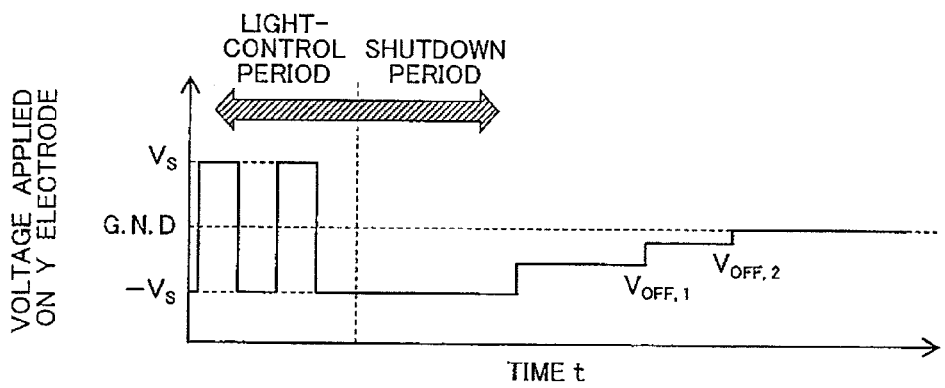

In this embodiment, as illustrated in FIG. 6C, constant voltages $V_{OFF,n}$ are applied between the X electrode 7 and the Y electrode 5 in a plurality of steps (n steps) from $V_S(-V_S)$ to 0 V. In FIG. 6C, the constant voltages are applied in two steps but they may be applied in three or more steps. In this embodiment, the voltage is decreased when the reduction in transmittance with respect to the time t ($|dΔT/dt|$) becomes small. In this case, $t(V_{OFF,1}) \geq t(V_{OFF,2})$ where $t(V_{OFF,1})$ represents the duration of $V_{OFF,1}$; and $t(V_{OFF,2})$ represents the duration of $V_{OFF,2}$. Thus, the change of the voltage from $V_{OFF,1}$ to $V_{OFF,2}$ corresponding to the change rate of the reduction in transmittance shortens the shutdown period, i.e., shortens a time interval to a subsequent cycle in repeated drives.

Figure 7C:
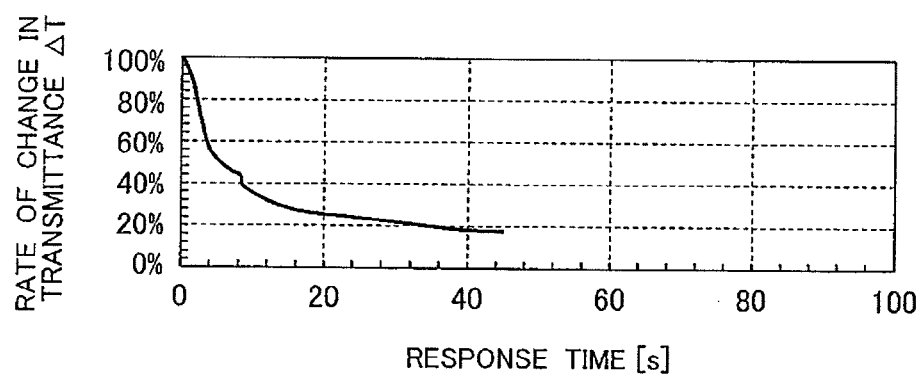

FIG. 7C depicts measured data of the response time of light control operation in the shutdown-period according to this embodiment. While employing a rectangular wave as the alternate-current waveform of the driving waveform, alternate-current waveforms differing in polarity by a half cycle are applied simultaneously to the X electrode 7 and the Y electrode 5 in the sustaining period at a frequency $f_S$ of 100 Hz, and waveforms symmetric with respect to the ground (GND) are applied to the X electrode 7 and the Y electrode 5 in the shutdown period. In this embodiment as illustrated in FIG. 6C, $V_{OFF,1}$ is $\sqrt{2}/2 V_S$, $V_{OFF,2}$ is $\sqrt{2}/4 V_S$, and $|V_{OFF,n}|$ is greater than $|V_{OFF,n+1}|$.

FIG. 7C demonstrates that the driving method (driving waveform) according to this embodiment requires a very short time for the reduction in transmittance in the shutdown period, i.e., provides a very short response time of light blocking operation as compared to that of the driving waveform in FIG. 7A as with First Embodiment. This indicates that the voltage applied in the sustaining period, to 0 V, a SPD and a light control device each exhibiting a high-speed light control action in the shutdown period are obtained without requiring modification of the basic structure of the SPD by applying constant voltages in a plurality of steps in the shutdown period from the voltage $V_S$. In addition, the application time for $V_{OFF}$ is shorter than that in Embodiment 1, thus further suppressing the fracture of materials constituting the SPD by increasing the number of steps of voltage application as in this embodiment.

Third Embodiment

Yet another embodiment of the present invention will be illustrated in detail below. An SPD according to this embodiment has a structure as with that of the SPD of First Embodiment, and a driving method according to this embodiment is as with that of First Embodiment, except for the shutdown period.

Figure 6D:
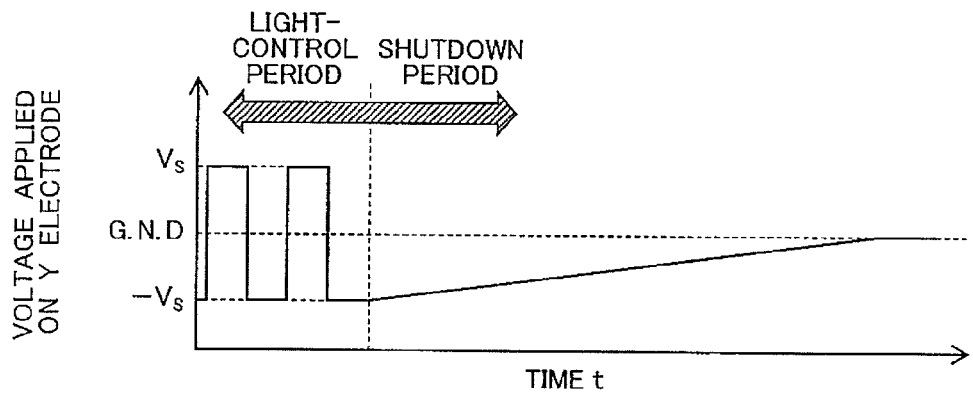

In this embodiment as illustrated in FIG. 6D, a ramp wave is applied between the X electrode 7 and the Y electrode 5 so as to bring the voltage from $V_S(-V_S)$ to 0 V. As used herein the term "ramp wave" refers to a waveform in which the applied voltage gradually changes with time. In this embodiment, $dV_1/dt_1$ is approximately constant where $V_1$ represents the voltage between the X electrode 7 and the Y electrode 5 upon the application of the ramp wave; and $t_1$ represents the application time of the ramp wave.

Figure 7D:
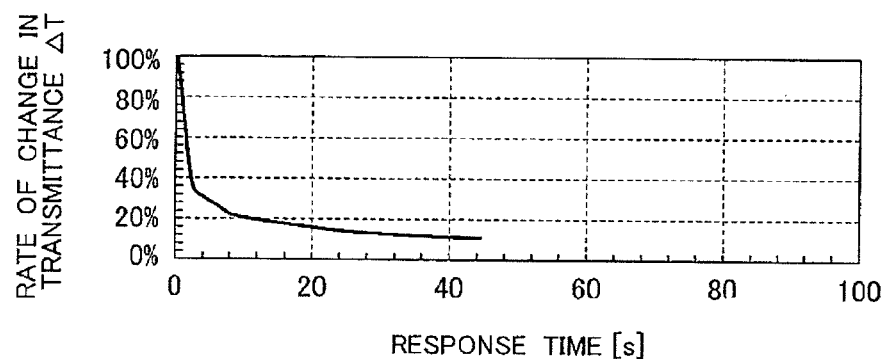

FIG. 7D depicts measured data of the response time of light control operation in the shutdown period in this embodiment, when measured using a rectangular wave as the alternate-current waveform of driving waveform at a frequency $f_S$ of 100 Hz. In this embodiment as illustrated in FIG. 6D, the slope of the ramp wave in a region from $V_S$ to 0 V ($|dV_1/dt_1|$) is 20 V/s or $8.0 \times 10^5$ V/m·s. The slope of the ramp wave may range 10 V/s or more and 30 V/s or less (10 to 30 V/s), or $1.0 \times 10^5$ V/m·s or more and $6.0 \times 10^6$ V/m·s or less ($1.0 \times 10^5$ to $6.0 \times 10^6$ V/m·s). The application of a ramp wave with a slope of $1.0 \times 10^5$ V/m·s or more protects materials constituting the SPD from fracture due typically to electrolysis during the application of the ramp wave waveform and allows the SPD to exhibit an equivalent light control action even upon another drive of the device, as with First Embodiment.

FIG. 7D demonstrates that the driving method (driving waveform) according to this embodiment requires a very short time for the reduction in transmittance in the shutdown period, i.e., provides a very short response time of light blocking operation as compared to that of the conventional driving method (FIG. 7A), as with First Embodiment. An SPD and a light control device each exhibiting a high-speed light control action in the shutdown period are obtained without requiring modification of the basic structure of the SPD by applying a ramp wave in the shutdown period so as to bring a voltage from the voltage $V_S$ applied in the sustaining period to 0 V. The driving method according to this embodiment requires a shorter time for the application of the voltage $V_{OFF}$ than that in Second Embodiment and thereby further satisfactorily protects materials constituting the SPD from fracture.

Forth Embodiment

Still another embodiment of the present invention will be illustrated in detail below. A SPD according to this embodiment has a structure as with that of the SPD of First Embodiment, and a driving method according to this embodiment is as with that of First Embodiment, except for the shutdown period.

Figure 6E:
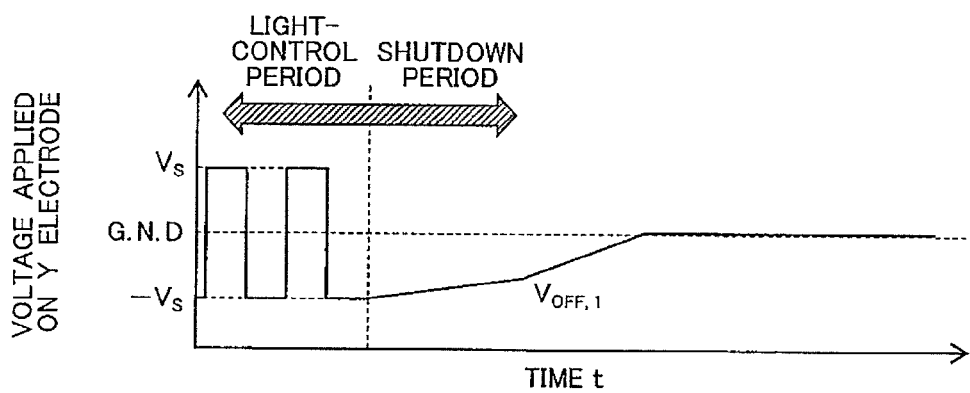

According to this embodiment as illustrated in FIG. 6E, a ramp wave is applied between the X electrode 7 and the Y electrode in the shutdown period as in Second Embodiment, except that the ramp wave has different slopes in a region from $V_S$ ($-V_S$) to $V_{OFF,1}$ (first ramp wave) and in a region from $V_{OFF,1}$ to 0 V (second ramp wave). The slope in the region from $V_{OFF,1}$ to 0 V is greater than that in the region from $V_S$ ($-V_S$) to $V_{OFF,1}$. Specifically, $|dV_1/dt_1|$ is smaller than $|dV_2/dt_2|$ where $V_1$ the voltage between the X electrode 7 and the Y electrode 5 upon the application of the first ramp wave; $t_1$ represents the application time of the first ramp wave; $V_2$ represents the voltage between the X electrode 7 and the Y electrode 5 upon the application of the second ramp wave; and $t_2$ represents the application time of the second ramp wave. In the driving method illustrated in FIG. 6E, the slope of the ramp wave is changed only once, but it may be changed multiple times. The shutdown period may be shortened with an increasing number of changes in slope.

According to this embodiment, the voltage is reduced at the time when the reduction in transmittance ($|d\Delta T/dt|$) becomes small. In this case, t ($V_S \rightarrow V_{OFF,1}$) is equal to or longer than t ($V_{OFF,1} \rightarrow 0$ V) where t ($V_S \rightarrow V_{OFF,1}$) represents the duration from $V_S$ ($-V_S$) to $V_{OFF,1}$; and t ($V_{OFF,1} \rightarrow 0$ V) represents the duration from $V_{OFF,1}$ to 0 V. This may protect materials constituting the SPD from electrolysis and may shorten the shutdown period.

Figure 7E:
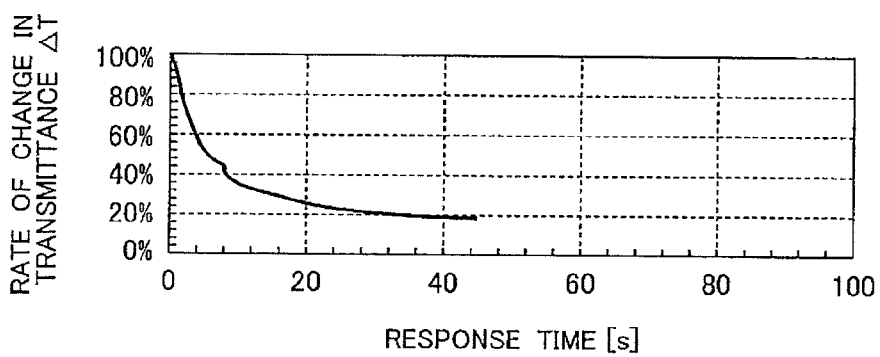

FIG. 7E depicts measured data of the response time of light control operation in the shutdown period in this embodiment. While employing a rectangular wave as the alternate-current waveform of the driving waveform at a frequency $f_S$ of 100 Hz, alternate-current waveforms differing in polarity by a half cycle are applied simultaneously to the X electrode 7 and the Y electrode 5 in the sustaining period, and waveforms symmetric with respect to the ground (GND) are applied to the X electrode 7 and the Y electrode 5 in the shutdown period. In this embodiment, the ramp wave has a slope of 20 V/s or $8.0 \times 10^5$ V/m·s in a region from $V_S$ to $V_{OFF,1}$ and a slope of 100 V/s or $4.0 \times 10^6$ V/m·s in a region from $V_{OFF,1}$ to 0 V, and $V_{OFF,1}$ is $\frac{1}{2} V_S$.

FIG. 7E demonstrates that the driving method (driving waveform) according to this embodiment requires a very short time for the reduction in transmittance in the shutdown period, i.e., provides a very short response time of light blocking action as compared to that of the conventional driving method (FIG. 7A), as with First, Second and Third Embodiment. This indicates that an SPD and a light control device each exhibiting a high-speed light control action in the shutdown period are obtained without requiring modification of the basic structure of the SPD by bringing a voltage in the shutdown period from the voltage $V_S$ which has been applied in the sustaining period to 0 V by using a ramp wave. The driving method according to this embodiment gives a further shorter shutdown period than that in Third Embodiment.

Fifth Embodiment

Another embodiment of the present invention will be illustrated in detail below. A SPD according to this embodiment has a structure as with that of the SPD of First Embodiment, and a driving method according to this embodiment is as with that of First Embodiment, except for the shutdown period.

Figure 6F:
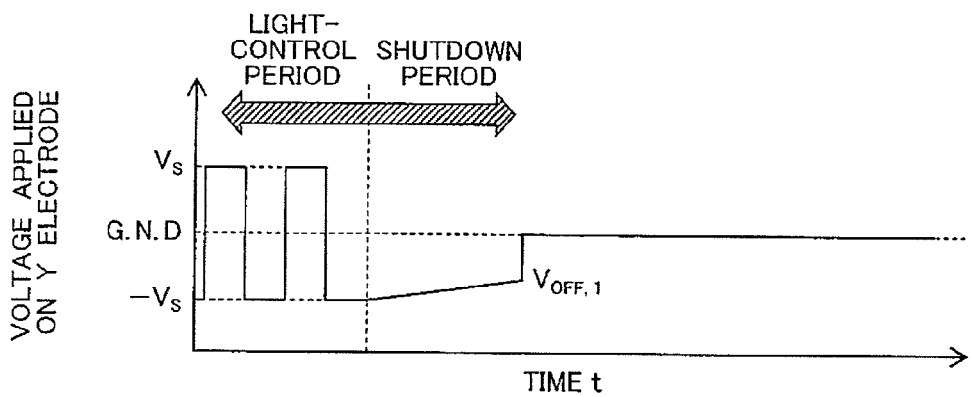

In this embodiment as illustrated in FIG. 6F, a ramp wave is applied between the X electrode 7 and the Y electrode 5 in the shutdown period as in Third Embodiment, except that the ramp wave is applied for a duration from $V_S$ ($-V_S$) to $V_{OFF,1}$, and that the voltage is brought into 0 V after the voltage reaches $V_{OFF,1}$, namely, before the alternate-current voltage applied between the X electrode 7 and the Y electrode 5 becomes 0 V by the action of the ramp wave. In the driving method illustrated in FIG. 6F, the voltages of the X electrode 7 and the Y electrode 5 are brought into 0 V at the time when the transmission shutdown rate becomes small.

Figure 7F:
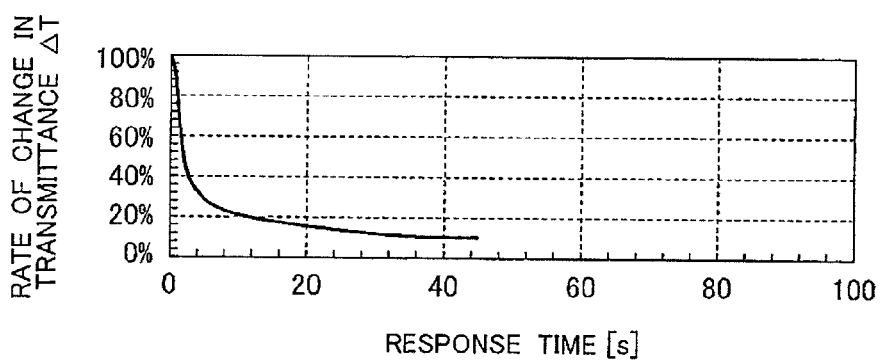

FIG. 7F depicts measured data of the response time of light control operation in the shutdown period according to this embodiment, while employing a rectangular wave as the alternate-current waveform of the driving waveform at a shutdown-period frequency $f_S$ of 100 Hz. In this embodiment, the ramp wave has a slope of 20 V/s or $8.0 \times 10^5$ V/m·s in a region from $V_S$ to $V_{OFF,1}$, and the voltage $V_{OFF,1}$ is 70 V. The ramp wave may have a slope in the range of 10 V/s or more and 30 V/s or less (10 to 30 V/s), or $1.0 \times 10^5$ V/m·s or more and $6.0 \times 10^6$ V/m·s or less ($1.0 \times 10^5$ to $6.0 \times 10^6$ V/s). The lower limit of the slope is such a slope as to protect materials constituting the SPD from fracture due typically to electrolysis during the application of the ramp wave and to allow the device to exhibit an equivalent light control action even upon another drive of the device, as in First Embodiment.

FIG. 7F demonstrates that the driving method (driving waveform) according to this embodiment requires a very short time for the reduction in transmittance in the shutdown period, i.e., provides a very short response time of light blocking operation as compared to that of the conventional driving method, as with First Embodiment. This indicates that a startup-period voltage $V_f$ can be immediately applied typically upon another light control action because the application time for the ramp wave is shorter than that in Third Embodiment. In addition, the driving method according to this embodiment gives a shutdown period shorter than that in Forth Embodiment.

Sixth Embodiment

An SPD according to this embodiment has an arrangement basically the same as with the arrangement of the SPD according to First Embodiment, except for including a light-control layer 17 held between a B-plate 2 and an A-plate 3. (SPD)

Figure 8:
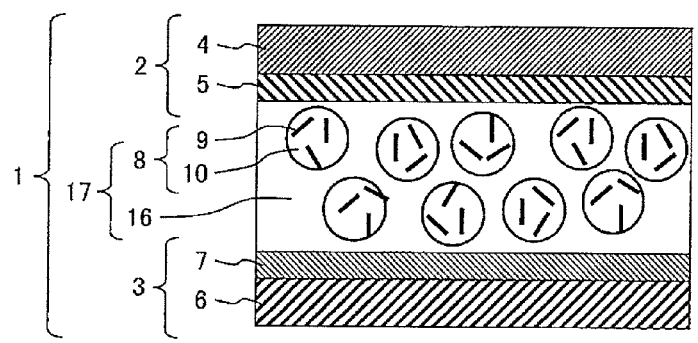
FIG. 8 is a cross section view illustrating the arrangement of a suspended particle device according to another embodiment.

FIG. 8 depicts a basic structure of the SPD according to this embodiment of the present invention. The suspended particle device (SPD) 1 includes a B-plate 2, an A-plate 3 and a light-control layer 17. The B-plate 2 includes a B-substrate 4 and a Y electrode 5. The A-plate 3 includes an A-substrate 6 and an X electrode 7.

The light-control layer 17 includes a suspension 8 and a resin matrix 16. The light-control layer 17 has a thickness of preferably 5 μm or more and 1000 μm or less (5 to 1000 μm), and more preferably 20 μm or more and 100 μm or less (20 to 100 μm).

The suspension 8 include light control particles 9 and a disperse medium 10. The suspension 8 is dispersed in the resin matrix 16. The suspension 8 dispersed in the resin matrix 16 has a size (average droplet diameter) of generally 0.5 μm or more and 100 μm or less (0.5 to 100 μm), preferably 0.5 μm or more and 20 μm or less (0.5 to 20 μm), and more preferably 1 μm or more and 5 μm or less (1 to 5 μm).

The suspension 8 preferably includes the light control particles 9 in a content of 1 percent by weight or more and 70 percent by weight or less (1 to 70 percent by weight) and the disperse medium 10 in a content of 30 percent by weight or more and 99 percent by weight or less (30 to 99 percent by weight), and more preferably includes the light control particles 9 in a content of 4 percent by weight or more and 50 percent by weight or less (4 to 50 percent by weight) and the disperse medium 10 in a content of 50 percent by weight or more and 96 percent by weight or less (50 to 96 percent by weight).

The resin matrix 16 is a polymer curable through heating and/or irradiation with an energy ray, supports the suspension 8 in a film SPD having bendability, and insulates the X electrode 7 and the Y electrode 5 from each other. Exemplary curable polymer media include polymer compositions each including a polymerization initiator and a curable polymeric compound. In this embodiment, a liquid polymer composition including a photoinitiator and a silicone resin as a polymeric compound is employed. The silicone resin may be synthetically prepared typically by subjecting a material compound to a dehydrogenating condensation and a dealcoholization reaction in the presence of tin 2-ethylhexane as an organic tin catalyst. Examples of the material compound herein include silanol-both-terminated siloxane polymers such as silanol-both-terminated polydimethylsiloxanes, silanol-both-terminated polydiphenylsiloxane-dimethylsiloxane copolymers, and silanol-both-terminated polydimethyldiphenylsiloxane; trialkylalkoxysilanes such as trimethylethoxysilane; and ethylenically-unsaturated-bond-containing silane compounds such as (3-acryloyxpropyl)methyldimethoxysilane. The silicone resin is preferably in a solvent-free form. Specifically, a solvent used for the synthetic preparation of the silicone resin is preferably removed after the synthetic reaction(s).

The resin matrix 16 preferably has a refractive index near to that of the disperse medium 10. Specifically, a difference in refractive index between the resin matrix 16 and the disperse medium 10 is preferably 0.002 or less. This suppresses scattering by the resin matrix 16 and the disperse medium 10 in the light-control layer 17. The disperse medium 10 for use herein is preferably a liquid copolymer having no electroconductivity and having no affinity for the resin matrix 16. Specifically, (meth)acrylic acid ester oligomers containing carbon-fluorine bond and/or hydroxyl group are preferred, of which (meth)acrylic acid ester oligomers each having both a carbon-fluorine bond and a hydroxyl group are preferred. The use of such a copolymer allows the light control particles 9 to be very uniformly dispersed in the suspension 8 and brings the light control particles 9 to be derived into the phase-separated suspension 8 upon phase separation. This is because one of the two monomer units which are carbon-fluorine bond and hydroxyl group is directed to the light control particles 9, and the other monomer unit serves to stably maintain the suspension 8 in the resin matrix 16.

Next, a forming process of the light-control layer 17 will be illustrated.

Initially, the suspension 8 and the polymeric compound are mixed to give a mixture including the suspension 8 dispersed as a droplet state in the polymeric compound. The mixture is applied to one of the A-substrate 6 and the B-substrate 4 to a certain thickness and a solvent contained in the mixture is removed by drying where necessary. Next, the other substrate is laid on and brought into intimate contact with the one substrate so that the electrode lying on the other substrate is in contact with the coated mixture.

Upon coating, the mixture may be mixed with a suitable solvent according to necessity. When a solvent is used, the solvent has to be removed after the application of the mixture to the A-substrate 6 or the B-substrate 4. Exemplary solvents usable herein include tetrahydrofuran, toluene, heptane, cyclohexane, ethyl acetate, ethanol, methanol, isoamyl acetate and hexyl acetate. Examples of processes for the formation of a light-control film including the resin matrix 16 and the liquid suspension 8 dispersed as fine droplets in the resin matrix 16 include a process of mixing light-control materials for use in this embodiment typically by a homogenizer or ultrasonic homogenizer to thereby disperse the suspension 8 finely in the resin matrix 16; a phase separation process through polymerization of a silicone resin component in the resin matrix 16; a phase separation process through solvent volatilization; and a thermal phase separation process.

The irradiation of the article in this state with an energy ray to cure the polymer composition gives a film-like SPD having the light-control layer 17 including the resin matrix 16 and the suspension 8 dispersed therein in the form of droplets.

(Driving Waveform and Response Time of Light Control Operation)

Figure 9:
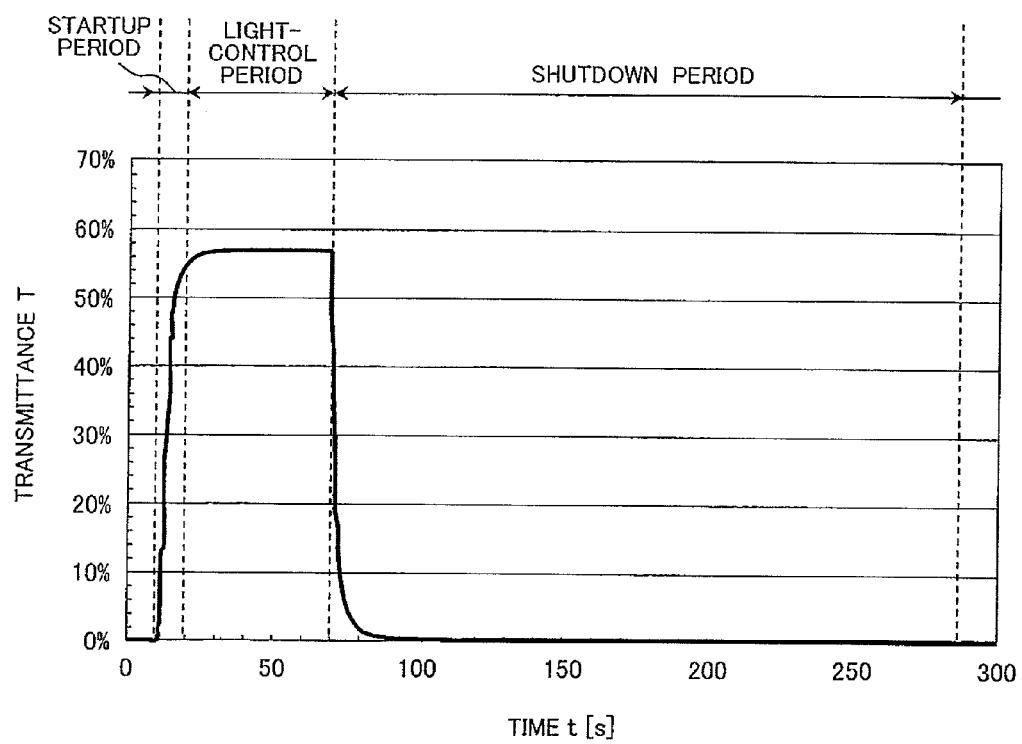
FIG. 9 is a graph showing a response time in a transmittance variation in the steps of controlling the light in the suspended particle device according to the embodiment of FIG. 8.

FIG. 9 illustrates how a transmittance T of incident light coming into the substrate in the electric field direction varies, namely, how a response time of a light control operation varies depending on a driving method of the SPD. The driving method herein is the driving method illustrated in FIG. 3, in which the driving-waveform voltage $V_{ON}$ and the sustaining-period voltage $V_S$ are set to be 100 V, the voltage $V_{OFF}$ is set to be 0 V, and the frequencies $f_{ON}$ and $f_S$ are set to be 50 Hz. The SPD according to this embodiment has an approximately maximum transmittance in the sustaining period when the voltage $V_S$ is set to be 100 V.

In the driving method of FIG. 9, it takes a longer time for the transmittance to vary in the shutdown period than in the startup period, as in the driving method illustrated in FIG. 5. Accordingly, a driving method similar to that in Embodiment 1 is employed in this embodiment.

Figure 10A:
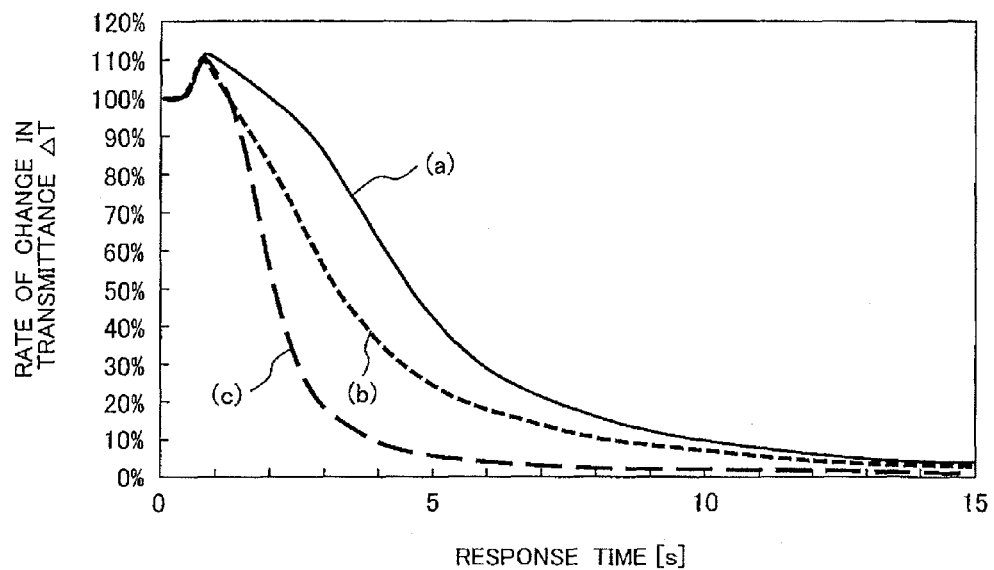
FIGS. 10A and 10B depict measured data of responses during the shutdown-periods in the embodiments.
Figure 10B:
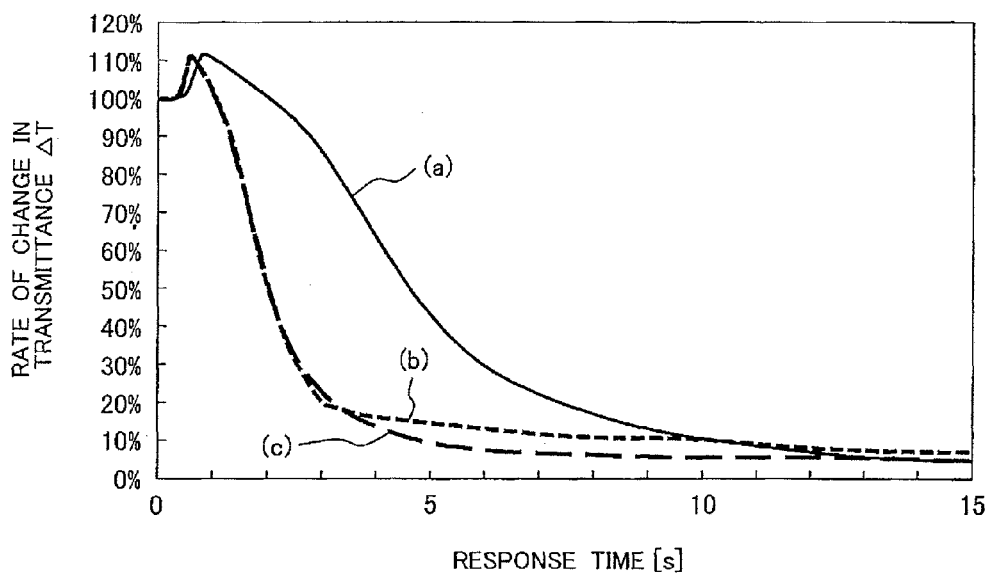

FIG. 10A depicts measured data of the response time of the light control operation in the shutdown period while employing a rectangular wave as the alternate-current waveform of driving waveform at a shutdown-period frequency $f_S$ of 100 Hz. FIG. 10B depicts measured data of the response time of the light control operation in the shutdown period in this embodiment, in which alternate-current waveforms differing in polarity by a half cycle are applied at a frequency $f_S$ of 100

Hz simultaneously to the X electrode 7 and the Y electrode 5 in the sustaining period, while employing a rectangular wave as the alternate-current waveform of the driving waveform, and waveforms symmetric with respect to the ground (GND) are applied to the X electrode 7 and the Y electrode 5 in the shutdown period. In FIGS. 10A and 10B, plots (a) depict measured data when the voltage $V_{OFF}$ is set to be 0 V immediately after the completion of the sustaining period; and plots (b) depict measured data according to this embodiment.

In this embodiment, an alternate-current waveform at a frequency $f_{OFF}$ of 0.25 Hz is applied in the shutdown period for a period corresponding to a half cycle at a voltage $V_{OFF}$ equal to the voltage $V_S$, as illustrated in FIG. 6B. The upper limit of the frequency $f_{OFF}$ is CFF, and the lower limit thereof is such a frequency that materials constituting the SPD are not damaged due typically to electrolysis during the application of the voltage $V_{OFF}$ and that the SPD exhibits an equivalent light control operation even upon another drive of the device. In consideration of these, the frequency $f_{OFF}$ is preferably 0.010 Hz or higher and 15 Hz or lower (0.010 to 15 Hz), and more preferably 0.10 Hz or higher and 15 Hz or lower (0.10 to 15 Hz), though it may vary depending on the voltage $V_{OFF}$.

FIG. 10A demonstrates that the driving method (driving waveform) according to this embodiment requires a very short time for the reduction in transmittance in the shutdown period, i.e., provides a very short response time of light blocking operation as compared to that of the conventional driving method. This indicates that a film-like SPD and a light control device each exhibiting a high-speed light control action in the shutdown period are obtained by applying an alternate-current waveform in the shutdown period at a frequency $f_{OFF}$ shorter than the sustaining-period frequency $f_S$ without requiring modification of the basic structure of the SPD.

Seventh Embodiment

Another embodiment of the present invention will be illustrated in detail below.

An SPD according to this embodiment has a structure similar to that in Sixth Embodiment, and a driving method herein is the same as that in Sixth Embodiment, except that the driving method in the shutdown period is the same as that in Third Embodiment.

Plots (c) in FIGS. 10A and 10B depict measured data of the response time of the light control operation in the shutdown period according to this embodiment. A ramp wave applied according to this embodiment has a slope of 20 V/s or $8.0 \times 10^5$ V/m·s in a region from $V_S$ to 0 V. The slope may range 10 V/s or more and 30 V/s or less (10 to 30 V/s) or $1.0 \times 10^5$ V/m·s or more and $6.0 \times 10^6$ V/m·s or less ($1.0 \times 10^5$ to $6.0 \times 10^6$ V/m·s). The lower limit of the slope is such a slope as to protect materials constituting the SPD from fracture due typically to electrolysis during the application of the ramp wave and to allow the device to exhibit an equivalent light control operation even upon another drive of the device, as in First Embodiment.

FIGS. 10A and 10B demonstrate that the driving method (driving waveform) according to this embodiment requires a very short time for the reduction in transmittance in the shutdown period, i.e., provides a very short response time of the light blocking operation as compared to the plots (a) in FIGS. 10A and 10B, as with Sixth Embodiment. This indicates that a film-like SPD and a light control device each exhibiting a high-speed light control operation in the shutdown period are obtained by brining the voltage from $V_S$ applied in the sus- taining period to 0 V in the shutdown period by the application of a ramp wave without requiring modification of the basic structure of the SPD.

Eight Embodiment

Figure 11:
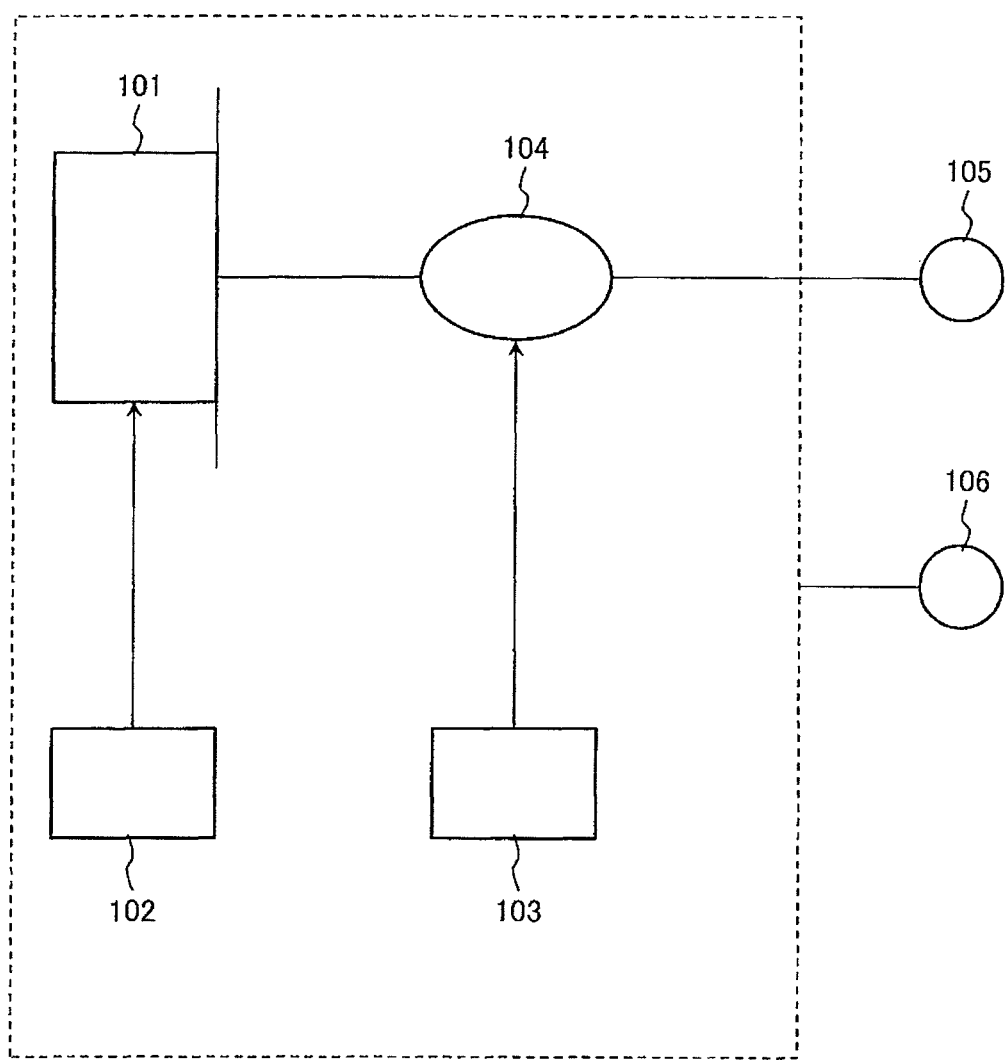
FIG. 11 is a block diagram illustrating an imaging device using the suspended particle device according to the embodiment.

FIG. 11 is a block diagram illustrating an imaging device using a suspended particle device according to one embodiment. FIG. 11 illustrates an imaging device 101, a driving circuit 102, a synchronizing signal generator 103, an adder 104, an analog interface 105 and a power supply interface 106. The imaging device 101 includes a SPD and a light control device according to the present invention.

The imaging device 101 is driven by the driving circuit 102 and outputs a signal which is fed to the adder 104. The synchronizing signal generator 103 outputs a signal based on an output signal of the driving circuit 102, and this output signal is also fed to the adder 104. The adder 104 outputs a signal which is fed to the analog interface 105. The power supply interface 106 supplies a power from outside to this apparatus (camera).

Next, the action of this apparatus will be illustrated.

Based on a pulse signal generated by the driving circuit 102, the synchronizing signal generator 103 generates a synchronizing signal for the synchronization in the horizontal direction and in the vertical direction between the outside and this apparatus and generates a synchronizing signal representing a pixel cycle of the imaging device 101. The synchronizing signal generated by the synchronizing signal generator 103 and the signal representing the pixel cycle of the imaging device 101 are superimposed upon the output signal of the imaging device 101 by the action of the adder 104 in a region which is not directly involved in the image, such as during a blanking period. The output signal of the adder 104 is outputted through the analog interface 105 to the outside.

What is claimed is:

1. A suspended particle device comprising:
a first substrate;
a first electrode arranged on a surface of the first substrate;
a second substrate;
a second electrode arranged on a surface of the second substrate; and
a suspension arranged between the first substrate and the second substrate,
wherein the suspension includes particles and a disperse medium, the particles having anisotropy in their shape,
wherein the particles are dispersed in the disperse medium and have a property that a direction of a long axis of the particles is aligned with a direction of an electric field,
the suspended particle device being configured to be connected to a drive unit including an alternate current voltage source so that an orientation of the particles is controlled by an alternate-current voltage to be applied between the first electrode and the second electrode by the alternate current voltage source, and
wherein the drive unit controls so that the alternate-current voltage is a first alternate-current voltage to change the orientation of the particles from a random orientation state to an orientation state along an electric field direction of the first alternate-current voltage in a startup period, is a second alternate-current voltage to maintain the orientation of the particles of the startup period in a sustaining period, and is an equipotential to change the orientation of the particles from the orientation state along the electric field direction to the random orientation state in a shutdown period, wherein "a" is greater than "b"

where "a" represents a frequency of the alternate-current voltage in a the sustaining period; and "b" represents a frequency of the alternate-current voltage in the shutdown period, wherein said suspended particle device is configured to receive one or more steps of constant voltages, or a ramp wave of voltage from said drive unit in a period of changing the frequency of the alternate-current voltage from "a" to "b" so as to shorten a reduction time of a transmittance in the shutdown period, and wherein the drive unit controls so that the alternate-current voltage is a third alternate-current voltage before changing the alternate-current voltage to the equipotential in the shutdown period after a completion of the sustaining period, an absolute value of the second alternate-current voltage being greater than an absolute value of the third alternate-current voltage.

2. The suspended particle device according to claim 1, further comprising a resin between the first substrate and the second substrate,
wherein the suspension is dispersed in the resin.

3. The suspended particle device according to claim 1, wherein the particles are rod-like, and
wherein the particles have aspect ratios of 5 to 30.

4. The suspended particle device according to claim 1, wherein the particles include at least one material selected from the group consisting of polyperiodides, carbon-base materials, metallic materials and inorganic compounds.

5. The suspended particle device according to claim 1, wherein the frequency "a" is 16 to 1000 Hz.

6. The suspended particle device according to claim 1, wherein the frequency "b" is 0.010 to 15 Hz.

7. The suspended particle device according to claim 1, wherein a first ramp wave is applied between the first electrode and the second electrode in the shutdown period, and
wherein $|dV_1/dt_1|$ is constant
where $V_1$ represents an alternate-current voltage between the first electrode and the second electrode upon the application of the first ramp wave; and $t_1$ represents an application time of the first ramp wave.

8. The suspended particle device according to claim 1, wherein a first ramp wave is applied between the first electrode and the second electrode in the shutdown period, and a second ramp wave is applied between the first electrode and the second electrode in the shutdown period after the application of the first ramp wave between the first electrode and the second electrode, and
wherein $|dV_1/dt_1|$ is smaller than $|dV_2/dt_2|$
where $V_1$ represents an alternate-current voltage between the first electrode and the second electrode upon the application of the first ramp wave; $t_1$ represents an application time of the first ramp wave;
$V_2$ represents an alternate-current voltage between the first electrode and the second electrode upon the application of the second ramp wave; and $t_2$ represents an application time of the second ramp wave.

9. The suspended particle device according to claim 1, wherein the particles have optical anisotropy.

10. A method for driving a suspended particle device, the device including:
a first substrate;
a first electrode arranged on a surface of the first substrate;
a second substrate;
a second electrode arranged on a surface of the second substrate;
a suspension arranged between the first substrate and the second substrate; and
a signal processing circuit,
the suspension including particles and a disperse medium,
the particles being dispersed in the disperse medium, the particles having anisotropy in their shape,
the method comprising the steps of:
applying an alternate-current voltage between the first electrode and the second electrode to control orientation of the particles; and
changing the alternate-current voltage applied between the first electrode and the second electrode and a frequency of the alternate-current voltage by the signal processing circuit,
wherein the signal processing circuit controls a frequency "a" (Hz) and a frequency "b" (Hz) to satisfy the following condition: a>b
wherein the frequency "a" is of an alternate-current voltage in a driving period, and the frequency "b" is of an alternate-current voltage in a shutdown period,
wherein one or more steps of constant voltages, or a ramp wave of voltage are applied in a period of changing the frequency of the alternate-current voltage from "a" to "b" so as to shorten a reduction time of a transmittance in the shutdown period,
wherein the alternate-current voltage is a first alternate-current voltage to change the orientation of the particles from a random orientation state to an orientation state along an electric field direction of the first alternate-current voltage in a startup period, is a second alternate-current voltage to maintain the orientation of the particles of the startup period in a sustaining period, and is an equipotential to change the orientation of the particles from the orientation state along the electric field direction to the random orientation state in the shutdown period,
wherein the alternate-current voltage is a third alternate-current voltage before changing the alternate-current voltage to the equipotential in the shutdown period after a completion of the sustaining period,
an absolute value of the second alternate-current voltage being greater than an absolute value of the third alternate-current voltage.

11. The method according to claim 10,
wherein the alternate-current voltage is applied in a half cycle or less during a period from a start of the shutdown period until the alternate-current voltage applied between the first electrode and the second electrode becomes 0 V.

* * * * *